(12) United States Patent
Aoba et al.

(10) Patent No.: US 6,368,399 B1
(45) Date of Patent: Apr. 9, 2002

(54) COMPOSITE PIGMENTS, COLORING COMPOSITIONS, AND IMAGE RECORDING SUBSTANCES

(75) Inventors: Masahiko Aoba; Yukio Kanbara; Shigeru Takarada; Kazutaka Aoki; Keiji Nakajima; Shotoku Takami, all of Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/614,713

(22) Filed: Jul. 12, 2000

(30) Foreign Application Priority Data

Jul. 21, 1999 (JP) ............................................ 11-206670

(51) Int. Cl.[7] .............................................. C09B 47/04
(52) U.S. Cl. ........................ 106/411; 106/412; 106/413; 106/31.78; 430/108.24; 524/88; 540/140; 540/141
(58) Field of Search ................................ 106/411, 412, 106/413, 31.78; 430/108.24; 540/140, 141; 524/88

(56) References Cited

U.S. PATENT DOCUMENTS

| | | | |
|---|---|---|---|
| 5,282,896 A | * | 2/1994 | Tsuchida et al. ............ 106/411 |
| 5,554,439 A | | 9/1996 | Ohkura et al. .............. 428/323 |
| 5,961,711 A | | 10/1999 | Saikatsu et al. ............. 106/498 |

FOREIGN PATENT DOCUMENTS

JP 59-142556 * 8/1984

* cited by examiner

*Primary Examiner*—Anthony Green
(74) *Attorney, Agent, or Firm*—Oblon, Spivak, McClelland, Maier & Neustadt, P.C.

(57) ABSTRACT

A composite pigment of a bluish green color comprises copper phthalocyanine and aluminum phthalocyanine which are preferably in the form of a mixture or solid solution. The composite pigment can be produced by mixing copper phthalocyanine and aluminum phthalocyanine into a mixture and then converting said mixture into a pigment form. A coloring composition comprises at least a resin and a pigment which comprises copper phthalocyanine and aluminum phthalocyanine. The coloring composition can be produced by mixing copper phthalocyanine and aluminum phthalocyanine which have been independently comminuted, into a composite pigment, and then kneading the pigment and a resin such that the pigment is dispersed in the resin. An image recording substance is produced using the coloring composition. The image recording substance can be a dry developer of a fine powder form or a wet developer of a liquid form, an ink-jet ink, or a thermal transfer ink ribbon with the coloring composition coated on a film-shaped or sheet-shaped base material.

27 Claims, No Drawings

COMPOSITE PIGMENTS, COLORING COMPOSITIONS, AND IMAGE RECORDING SUBSTANCES

BACKGROUND OF THE INVENTION a) Field of the invention

This invention relates to composite pigments comprising copper phthalocyanine (hereinafter abbreviated as "CuPc") and aluminum phthalocyanine (hereinafter abbreviated as "AlPc"), and also to coloring compositions and image recording substances, both of which make use of the composite pigments.

b) Description of the Related Art

CuPc pigment is one of excellent pigments having a vivid blue color tone and a variety of superb fastness, and has long been used as one of the three primary colors for process printing. In addition to conventional printing methods making use of printing plates, this pigment is also finding increasing utility as a coloring agent in various image recording methods led by electrophotographic recording, ink-jet recording and thermal transfer recording. In these recording methods, there is an increasing demand for a pigment having a bluish green color tone, as a substitute for CuPc pigment having a blue color, and also a vivid and transparent image recording substance making use of this pigment to achieve still better color reproducibility upon formation of pictures, images, marks or the like (hereinafter referred to as "pictures").

A pigment of a bluish green color is generally prepared by mixing CuPc pigment with a chlorinated CuPc pigment. As an improved version of this mixed pigment, JP 5-263006 discloses a solid solution pigment of a bluish green color obtained from a high-chlorination CuPc pigment and a low-chlorination CuPc pigment. Further, JP 9-68607 discloses a medium-chlorination CuPc pigment of a bluish green color, which is available by adjusting, in the stage of synthesis of CuPc, the number of chlorine atoms to be bonded to CuPc.

Incidentally, another serious problem associated with use of a pigment is an impact which the use of the pigment gives on the global environment. From this viewpoint, the above-described CuPc-base bluish green pigments are not desired in that they all require as a premise use of a chlorinated CuPc pigment and contain chlorine atoms. From the standpoint of regulating use of heavy metals, there is also a move toward imposing a limitation on the use of CuPc-base pigments themselves, said CuPc-base pigments containing copper, heavy metal, in their structures.

SUMMARY OF THE INVENTION

An object of the present invention is, therefore, to provide a novel composite pigment of a bluish green color, a novel coloring composition of a bluish green color and a novel image recording substance making use of the coloring composition, all of which can form vivid and transparent pictures and moreover, have given consideration to the environment.

With a view to resolving the above-described problems of bluish green pigments made primarily of such conventional chlorinated CuPc-base pigments and hence, to developing pigments, coloring compositions and image recording substances having similar excellent characteristic properties as such chlorinated CuPc-base pigments, the present inventors have proceeded with various research. As a result, it has been found that a mixed pigment or solid solution pigment comprising CuPc and AlPc, both of which are free of chlorine atoms, does not contain any chlorine atoms and as a whole pigment, contains copper only at a low level, and thus, does not destroy the environment, has a variety of excellent fastness, can form pictures having a vivid color tone, and is useful for various applications, especially as a coloring agent in image recording substances.

The above-described object can be achieved by the present invention which will hereinafter be described. Namely, the present invention provides a composite pigment of a bluish green color, comprising CuPc and AlPc (the term "composite pigment" may hereinafter be simply called "pigment"), a coloring composition making use of the pigment, and an image recording substance making use of the composition.

The bluish green composite pigment, bluish green coloring composition an bluish green image recording substances according to the present invention are vivid and transparent and moreover, have given consideration to the environment.

DETAILED DESCRIPTION OF THE INVENTION AND PREFERRED EMBODIMENTS

The present invention will hereinafter be described in more detail based on certain embodiments of the present invention.

The pigment according to the present invention is characterized in that it comprises CuPc and AlPc. The coloring composition according to the present invention is characterized in that it contains at least a pigment and a resin and the pigment comprises CuPc and AlPc. Further, the image recording substance according to the present invention is characterized in that it contains the above-described pigment comprising CuPc and AlPc.

CuPc which is used in the present invention is by itself a known compound and practically contains no chlorine atom in its structure. On the other hand, AlPc which is also used in the present invention is also a known compound by itself, and in general, is produced, for example, by reacting phthalonitrile or 1,3-diiminoisoindoline in the presence of aluminum chloride in an organic solvent of high boiling point such as 1-chloronaphthalene or quinoline, although it is not intended to impose any particular limitation on its production process. Depending upon a difference in the synthesis process or the conversion method into the pigment, AlPc takes a structure such as chloro-AlPc, hydroxy-AlPc or AlPc dimer. It is common to use these AlPc compounds either singly or in combination. Use of AlPc dimer which is the best in a variety of fastness is preferred for the present invention, although AlPc is not limited to AlPc dimer in the present invention.

Examples of the process according to the present invention for the production of the composite pigment can include a process comprising mixing CuPc and AlPc, a process comprising concurrent synthesis of both of them, and a process comprising synthesizing one of the compounds in the presence of the other compound. Whichever process is used, a mixture or solid solution of CuPc and AlPc may be subjected to conversion into a pigment as needed. In the process comprising mixing of CuPc and AlPc out of the above-described processes, the mixture may be subjected to conversion into a pigment subsequent to the mixing, or CuPc and AlPc, both of which have been converted into pigments, may be mixed together. The mixing can be either before or after the conversion into pigments. Further, the mixing can be mixing of CuPc and AlPc in powder forms, mixing of them in water-wet press cake forms, or mixing of them in other forms. As a still further alternative, CuPc and AlPc may be mixed together in the course of production of the coloring composition according to the present invention. According to the above-described concurrent synthesis process, CuPc and AlPc are synthesized in the form of a mixture by using, as a metal source, a mixture of a copper salt and an aluminum salt at a desired ratio upon synthesizing the metal phthalocyanins by a process known to date. As an alternative, a mixture of CuPc and AlPc can also be obtained by synthesizing AlPc or CuPc in the presence of CuPc or AlPc.

The solid solution pigment, which comprises CuPc and AlPc and is useful in the practice of the present invention, can be obtained by a process in which CuPc and AlPc are dissolved in concentrated sulfuric acid or polyphosphoric acid and the thus-obtained solution is then poured into water to have a solid solution of CuPc and AlPc precipitated in the form of fine particles, a process (acid paste process) in which CuPc and AlPc are mixed with concentrated sulfuric acid or polyphosphoric acid to form a mixture of CuPc sulfate and AlPc sulfate and the mixture is then poured into water to have a solid solution of CuPc and AlPc precipitated in the form of fine particles, or a process in which CuPc and AlPc are together subjected to comminution into fine particles of their solid solution. It may be preferable to convert these fine particles of the solid solution into a composite solid solution pigment, as needed, by treating them with an organic solvent or the like and then causing them to crestalize into particles of a desired particle size. Owing to the formation of a solid solution and its conversion into a pigment as described above, the resulting composite solid solution pigment can provide pictures improved in the vividness, brightness, transparency and the like of hue.

The ratio of CuPc to AlPc in the composite pigment according to the present invention can be freely determined depending upon the desired bluish green color tone, and no particular limitation is imposed thereon. Nonetheless, CuPc and AlPc account for 95 to 5 wt. % and 5 to 95 wt. %, respectively, preferably 70 to 30 wt. % and 30 to 70 wt. %, respectively. Use of AlPc in a greater proportion can lead to a composite pigment of a more greenish color tone.

Compared with CuPc pigment, AlPc pigment is long known to be inferior in vividness, coloring power, light fastness and the like. However, the composite pigment according to the present invention, especially the composite pigment in the form of a solid solution of CuPc and AlPc is free from reductions in pigment characteristics, such as vividness, coloring power and weatherability, despite the addition of AlPc and presents a bluish green color having excellent pigment characteristics such as vividness, coloring power and weatherability, so that it is useful as a coloring agent for image recording substances of a bluish green color.

To provide still better vividness, brightness, transparency and the like upon forming pictures with an image recording substance prepared by using the below-described coloring composition of this invention, processings such as controlling of crystalinity of CuPc and AlPc which make up the composite pigment and controlling of configurations and particle sizes of crystalline particles within desired ranges can be conducted by methods known per se in the art. For similar purposes, the composite pigment may be treated using a conventionally-known pigment treatment, dispersant, surfactant or the like, such as rosin, an aliphatic amine, a CuPc or AlPc derivative, or a macromolecular dispersant after preparation of the composite pigment or upon dispersion of the pigment.

In the case of a conventional pigment for use in coloring paints, plastics or the like, pigment particles are prepared to have a large weight average particle size (hereinafter simply called "average particle size"), for example, a particle size of from 500 to 700 nm so that the pigment is provided with excellent hiding power, weatherability, heat resistance, dispersibility in media, and the like. Use of a pigment, which is formed of such coarse particles, as a coloring agent in an image recording substance, however, leads to pictures of a color hue lowered in transparency, brightness, vividness and the like. When a pigment is used as a coloring agent especially in a full-color recording substance, the pigment should preferably be able to provide the resulting pictures or images with excellent transparency, brightness, vividness and the like. To this end, the composite pigment according to the present invention, which comprises CuPc and AlPc, may preferably be dispersed in a resin by a conventional dispersing method such as flushing, heated milling or wet dispersion such that it is reduced to an average particle size of 200 nm or smaller, preferably 150 nm or smaller. For the production of the coloring composition according to the present invention, it is preferred to use a pigment which has been pulverized beforehand into fine particles such that the fine particles fall within the above-described size range of dispersed particles.

No particular limitation is impose on the method for pulverizing the pigment into fine particles in the present invention, and this pulverization can be conducted by a conventionally known method. Examples can include the above-described acid paste process and a method involving impact grinding or milling. Illustrative of the impact grinding is dry milling which uses a ball mill or oscillating mill. A grinding medium such as steel balls or steel rods is used, and an inorganic salt such as anhydrous sodium sulfate, sodium chloride or aluminum sulfate may be used as a milling aid as needed. Milling can be salt milling or solvent salt milling, and the above-described inorganic salt is used as a milling aid. Other pulverization methods of pigment particles include a so-called direct conversion method in which by using a high-shear beads mill or the like, the coloring composition or image recording substance according to the present invention is directly produced at the same time as comminution and milling of pigment particles are performed. The fine particulate pigment obtained as described above provides pictures which have vividness, brightness, transparency and the like and are excellent in various fastness such as light resistance, heat resistance, solvent resistance, chemical resistance and waterproofness.

The above-described composite pigment according to the present invention has excellent pigment characteristics as mentioned above and is useful as a coloring agent of a bluish green color for various applications, for example, in printing inks, paints, plastics, dry developers of fine powder form, wet developers of liquid form, ink-jet inks, thermal transfer ink ribbons, resists for color filters, and other applications.

The coloring composition according to the present invention is produced by mixing CuPc and AlPc (or a mixed pigment or solid solution pigment thereof) with a resin. Any mixing method can be used insofar as the above-described pigments can be evenly dispersed in the resin, and no particular limitation is imposed on the process according to the present invention for the production of the coloring composition.

Examples of process for the production of the coloring composition can include the following processes:

(A) CuPc and AlPc, which have been independently comminuted, are mixed into a composite pigment, and the pigment and a resin are kneaded by a heated kneading machine, such as a roll mill or extruder, such that the pigment is evenly dispersed in the resin.

(B) A water-wet press cake of CuPc and a water-wet press cake of AlPc are mixed, the resulting mixture is dried, the dried mixture is comminuted into a composite pigment, and the pigment and a resin are then kneaded in such a heated kneading machine as described above such that the pigment is evenly dispersed in the resin.

(C) A mixture of CuPc and AlPc are comminuted into a composite pigment, and the pigment and a resin are then kneaded by such a heated kneading machine as described above such that the pigment is evenly dispersed in the resin.

(D) A pigment source—which is selected from the group consisting of (a) a water-wet press cake of CuPc and a water-wet press cake of AlPc, (b) a mixture of both of the press cakes and (c) a water-wet press cake of a composite pigment comprising CuPc and AlPc—and a resin are charged in a heated kneader or the like, and are then kneaded by melt flushing or the like such that the pigment source is evenly dispersed in the resin.

(E) A comminuted powder (pigment) of CuPc, a comminuted powder (pigment) of AlPc, a resin and a small amount of water are charged in a heated kneader or the like, and are then kneaded by melt flushing or the like such that the comminuted powders of the phthalocyanins are both evenly dispersed in the resin.

(F) A composite pigment, which comprises CuPc and AlPc, is evenly dispersed in a polymerization reaction mixture of at least one monomer adapted to make up a resin, and the monomer is then polymerized such that the composite pigment is dispersed in the resin.

Examples of the resin used in the production of the coloring composition according to the present invention can include thermoplastic resins and waxes. Each of these resins functions as a dispersion medium for a pigment in the case of a coloring composition which is used in a solid form, but functions as a dispersant for a pigment in the case of a coloring composition which is used in a liquid form. Further, when the coloring composition is actually used as a recording substance, the resin functions as a binder for the pigment.

For such purposes, resins—which have conventionally been used in image recording substances such as dry developers for electrophotography, electrostatic printing, electrostatic recording or the like, oil-base or water-base ink-jet inks and thermal transfer ink ribbons—are all usable, and no particular limitation is imposed. Depending upon each of the above-described applications, conventionally-known additives, for example, charge control agents, flow agents, organic solvents or aqueous media, and/or the like can be added to the coloring composition of this invention as needed.

The coloring composition according to the present invention may be produced such that from the beginning, it contains the pigment at a concentration suited for its application purpose. As an alternative, it may be produced as a high-concentration coloring composition in which the pigment is contained at a high concentration. The high-concentration coloring composition contains the pigment at the high concentration and, when it is thoroughly milled beforehand with a resin to sufficiently disperse the pigment or when it is subjected beforehand to toning by adding one or more other pigments as needed, facilitates subsequent production of an image recording substance by the use of the coloring composition. The high-concentration coloring composition can be in any one of solid, paste and liquid forms, for example, in the form of coarse particles, coarse powder, fine powder, a sheet or small balls. The content of the pigment in the high-concentration coloring composition may generally range from 10 to 70 wt. %, with 20 to 60 wt. % being preferred.

Examples of a process for the production of the high-concentration coloring composition can include dry dispersion methods, which require kneading under heat, and wet dispersion methods which use ceramic beads, glass beads, steel balls or the like and a dispersion medium. Especially for the dry dispersion of a pigment at a high concentration in a resin, it is the common practice to bring the resin into a molten state and to have particles of the pigment dispersed in the resin by using a kneading disperser such as a two-roll mill, three-roll mill, heated kneader, heated elevated-pressure kneader, single-screw extruder, twin-screw extruder or the like. Whichever process or method is used, it is desired to conduct the kneaded dispersion of the pigment and the resin at a temperature not higher than 120° C. By conducting the dispersion at such a relatively low temperature, the particle size of pigment particles which were prepared as fine particles in advance is retained, as is, in the resulting coloring composition. By also conducting the subsequent production of the recording substance at a temperature not higher than 120° C., the particle size of the pigment particles is also retained, as is, as mentioned above. As a consequence, an image recording substance capable of producing pictures of a hue excellent in vividness, brightness, transparency and the like can be obtained. Incidentally, if the above-described temperature is raised to a temperature higher than 120° C., the pigment particles undergo flocculation or crystal growth, leading to reductions in vividness, brightness, transparency and the like.

As a method for dispersing a pigment at a high concentration in a resin, it is more preferred to flush an aqueous paste of the pigment with the resin in a molten form (atmospheric melt flushing method). Illustrative of this method is the method proposed in JP 2-175770. Described specifically, a water-wet press cake of a pigment and a resin are charge into a steam-heated kneader or flusher. Without using any solvent, they are kneaded under atmospheric pressure at a temperature close to the melting point or softening point of the resin such that the pigment in an aqueous phase (press cake) is caused to migrate into a resin phase. Water separated during the kneading is removed, and water still remaining there is eliminated through evaporation. Owing to the use of the water-wet press cake of the pigment, the pigment is caused to migrate into the resin while allowing the pigment to retain its small particle size which it had in the press cake, and further, the kneading and dispersing temperature can be held below 100° C. as long as water remains. There is accordingly a characteristic feature that flocculation or crystal growth of pigment particles, which would otherwise take place at elevated temperatures, can suppressed.

According to another preferred dispersion method of a pigment, water is added to the pigment, which is in a powder form, and a resin. In a similar manner as described above, they are forcedly kneaded at a temperature, which is not higher than 120° C. and is close to the melting point or softening point of the resin, at atmospheric pressure in the absence of any solvent, whereby the pigment is caused to migrate into the resin phase, separated water is eliminated, and still remaining water is caused to evaporated.

As has been described above, the applications of the coloring composition according to the present invention are similar to the above-described applications of the composite pigment according to the present invention, and can be used in various applications still more easily than the use of the composite pigment.

The coloring composition of the present invention can be formulated into various image recording substances according to the present invention by adding various additives, solvents and the like, which have been used conventionally, to the coloring composition depending upon the application purposes. Illustrative of the image recording substances according to the present invention are so-called fine-powder-form dry developers, liquid-form wet developers, electrostatic recording substances, ink-jet inks, and thermal transfer ink ribbons.

The content of the pigment in the image recording substance according to the present invention varies depending upon the application purpose of the recording substance, and the content of the bluish green pigment in the whole recording substance—which contains the pigment, a resin, other additives and a medium—may generally range from 2 to 20 wt. %. When used as a recording substance for electrophotography or the like, the pigment concentration may be in a range of from 2 to 15 wt. %, preferably from 3 to 10 wt. %. When employed as a wet recording substance for electrostatic recording or the like, the pigment concentration may range from 1 to 20 wt. %, preferably from 3 to 10 wt. % in the case of a high-concentration recording substance. In general, the recording substance is used after diluting the same tenfold to thirtyfold in a diluent. When the image recording substance is a thermal transfer ink ribbon, the concentration of the pigment may be in a range of from 4 to 15 wt. %, preferably from 6 to 10 wt. %. When the recording substance is used as an ink-jet ink, the pigment concentration may be in a range of from 3 to 20 wt. %, preferably from 5 to 10 wt. %. In essence, the pigment should be added at a most preferred concentration depending upon the application purpose.

Image recording substances—such as dry developers or wet developers for electrophotography, electrostatic printing, electrostatic recording and the like, water-base, oil-base or solid ink-jet inks, and thermal transfer ink ribbons—can be produced by using coloring compositions according to the present invention, said coloring compositions having been prepared with pigment concentrations suited for the desired applications, respectively, as they are. As an alternative, they can also be produced by dispersing or diluting the above-described high-concentration coloring composition in a resin, a resin solution or an addition-polymerizable monomer. Upon their production, charge control agents, flow agents, ferromagnetic materials, organic solvent media, aqueous media and the like can be added as needed.

A description will be made, for example, about image recording substances useful in electrophotography, electrostatic printing, electrostatic recording or the like. Dry recording substances can include dry recording substances in the form of fine powders, which are produced by a grinding technique or a polymerization technique (suspension polymerization technique, emulsion polymerization mixture flocculation technique). According to the grinding technique, a pigment, a resin, a charge control agent and the like are kneaded under heat. After cooling, the kneaded mass is ground, followed by classification to collect particles of desired particle sizes. According to the suspension polymerization technique, a pigment, a charge control agent and the like are dispersed in an addition-polymerizable monomer. The monomer is then formed into an o/w-type emulsion to control the diameters of droplets. By suspension polymerization, a recording substance is obtained in the form of colored fine particles. According to the emulsion polymerization mixture flocculation technique, a dispersion in which a pigment, a charge control agent and the like are contained in a finely-divided form is mixed with an emulsion polymerization reaction mixture, and the colored emulsion polymerization reaction mixture so obtained is polymerized. Polymer particles are caused to cohere or flocculate so that the pigment and charge control agent were allowed to co-precipitate together with the polymer particles or were adsorbed on the polymer particles. Colored particles formed as described above are pulverized into particles of predetermined particle sizes. Further, conventionally-known materials such as flow agents and ferromagnetic materials can be added as needed to the dry recording substances produced by the respective techniques.

On the other hand, wet recording substances are each produced by a technique in which a pigment is dispersed together with a resin, a dispersion stabilizer, a charge control agent and the like in a solvent medium by using a wet medium disperser or by a technique in which fine particles of a colored resin composed of a pigment, a resin, a charge control agent and the like are likewise dispersed together with a dispersion stabilizer or an additional charge control agent in a solvent medium by using a wet medium disperser.

Image recording substances making use of coloring compositions according to the present invention are bluish green image recording substances. They can be used singly. In addition, as cyan colors in multi-color or full-color recording substances, they can also be used in combination with image recording substances of magenta, yellow or black color.

The present invention will next be described more specifically by Examples, in which "part" or "parts" and "%" are on a weight basis.

Incidentally, the average particles sizes of particles of pigments and the average particle sizes of particles of pigments in compositions, which will be referred to in the subsequent Examples, are average particle sizes measured by the following methods, respectively.

(1) Measuring method of the average particle size of particles of a pigment

Using a Hoover muller, 0.5 g of a pigment was dispersed in 0.7 g of a dispersant. After the dispersion was diluted with water to a measuring concentration, the diluted dispersion was conditioned under ultrasonic waves for 1 minute to provide a test dispersion. The test dispersion was then measured using a "Coulter Submicron Particle Analyzer Model N-4" (trade name, manufactured by Coulter, Inc.).

(2) Measuring method of the average particle size of particles of a pigment in a coloring composition A coloring composition (0.1 g) was dissolved in 10 cc of xylene. After the solution was diluted with xylene to a measuring concentration, the diluted solution was conditioned under ultrasonic waves for 1 minute to provide a test solution. The test solution was measured in a similar manner as in the above-described measurement.

EXAMPLE 1

Phthalonitrile (50.0 parts), 1-chloronaphthalene (300.0 parts) and aluminum chloride (13.0 parts) were charged in a reaction vessel and were reacted at 230° C. for 5 hours. A reaction product was collected by filtration, thoroughly washed successively with methanol and a 2% dilute aqueous solution of sulfuric acid, collected by filtration, and then dried. After the thus-obtained reaction product was dissolved in concentrated sulfuric acid (500.0 parts), the resulting solution was poured into ice water (3,000 parts) while controlling the temperature of the ice water below 10° C., whereby fine particles of AlPc were allowed to precipitate and crystallize. Those fine particles of AlPc were collected by filtration and then thoroughly washed with water, whereby a press cake of AlPc was obtained. Subsequently, water was added such that the total amount of water, including the water in the press cake, became 1,000 parts, whereby an aqueous slurry was prepared. Butyl cellosolve (20 parts) was added, followed by stirring and mixing at 90° C. for 6 hours. The resulting mixture was filtered to collect a solid matter. The solid matter was washed with water, dried and then ground, whereby AlPc pigment (38.2 parts) was obtained. The pigment was found to have an average particle size not greater than 200 nm, and showed a bluish green hue.

EXAMPLE 2

A composite pigment according to the present invention was obtained in a similar manner as in Example 1 except that the amount of 1-chloronaphthalene was changed to 600,0 parts, CuPc powder was added in an amount of 40 parts, and the synthesis of AlPc was conducted in the presence of CuPc. Powder (100 parts) of the composite pigment so obtained was added to an offset ink varnish (400 parts). Subsequent to thorough premixing, the pigmented varnish was milled by a three-roll mill, whereby an offset ink of a bluish green color was obtained. When printing was performed on a paper sheet by using the ink, a print of a vivid, bright, bluish green color was obtained.

EXAMPLE 3

An aqueous slurry of CuPc pigment obtained by a known process and an aqueous slurry of AlPc obtained in Example 1 were mixed at a ratio of 1:1. A solid matter was collected by filtration, washed with water, dried and then ground, whereby a bluish green composite pigment of the present invention was obtained. Using this composite pigment, a bluish green offset ink was obtained in a similar manner as in Example 2. The ink presented a vivid, bright, bluish green color.

EXAMPLE 4

CuPc (10 parts), sodium chloride (100 parts) and a high boiling-point alicyclic hydrocarbon (1 part) were filled in a ball mill, and pulverization was conducted for 10 hours so that the contents were converted into a pigment. Post treatments such as filtration and washing were then conducted by usual methods, whereby a press cake of CuPc pigment was obtained. The solid content as CuPc pigment was 40%. The thus-obtained press cake was dried and ground into powdery CuPc pigment. The CuPc pigment so produced was found to have an average particle size not greater than 200 nm, and presented a blue (cyan) hue.

Next, the press cake of CuPc pigment and the water-wet press cake of AlPc pigment, which had been obtained in Example 1, were mixed at a weight ratio of 1:1 in terms of solid contents. The resulting mixture was dried and ground, whereby a composite pigment composed of the CuPc pigment and the AlPc pigment was obtained. The pigment was found to have an average particle size not greater than 200 nm, and presented a bluish green hue.

EXAMPLE 5

CuPc (6 parts) employed in Example 4 and AlPc (4 parts) obtained in Example 1 were mixed and ground into fine particles of a CuPc/AlPc solid solution. After those fine particles were converted into a pigment with an organic solvent in a similar manner as in Example 1, the pigment was collected by filtration, washed, and again collected by filtration, whereby a press cake was obtained. The press cake was dried and then pulverized into a composite pigment of solid solution CuPc/AlPc (weight ratio: 6/4). The pigment was found to have an average particle size not greater than 200 nm, and presented a bluish green hue.

EXAMPLE 6

Following the atmospheric melt flushing method proposed in JP 2-175770, the press cake (37.5 parts, solid content: 40%) of CuPc pigment obtained in Example 4, the press cake (39.5 parts, solid content: 38%) of AlPc pigment obtained in Example 1 and a styrene-methacrylate ester copolymer (softening point: about 110° C., glass transition point: about 56° C., GPC weight average molecular weight: about 50,000;70 parts) were charged in a heated kneader and were heated with steam under mixing, whereby melt flushing was conducted. While controlling the temperature of the resin under kneading within a range of from 90 and 95° C., flushing was continued to separate water. Separated water was discharged, and still remaining water was caused to evaporate out while kneading the mass under heat. After the kneading was continued further, the kneaded mass was taken out of the kneader, cooled and then pulverized, whereby a high-concentration coloring composition of a bluish green color (pigment content: 30%) was obtained in the form of coarse powder. The pigment in the coarse powder was found to have an average particle size not greater than 200 nm.

The thus-obtained high-concentration coloring composition (11.7 parts) and a negative charge control agent of the chromium complex type (3 parts) were kneaded with the styrene-methacrylate ester copolymer (85.3 parts) in a manner known per se in the art. The kneaded mass was cooled, ground, and then pulverized by a jet mill. Classification was thereafter conducted, whereby bluish green fine powder of 5 to 20 $\mu$m was obtained. In a conventional manner, colloidal silica was subsequently added as a flow agent and thoroughly mixed, and the resulting mixture was then mixed with a carrier (magnetic iron powder) to provide a bluish green dry developer for electrophotography.

The dry developer was charged in an electrophotographic copying machine for the full-color development of negative charges, and pictures were formed on paper sheets. The pictures presented a vivid, bright, bluish green color, and were excellent in various properties including light fastness. When pictures were formed on polyester sheets for overhead projectors (hereinafter abbreviated as "OHP"), the pictures had high transparency, and images of a vivid bluish green color were displayed on an OHP screen.

Using C.I. Pigment Red 122 as a magenta pigment, C.I. Pigment Yellow 93 as a yellow pigment and C.I. Pigment Black 7 as a black pigment, each of which had been pulverized to an average particle size not greater than 200 nm, a developer of a magenta color (pigment content: 4.4%), a developer of a yellow color (pigment content: 4.4%) and a developer of a black color (pigment content: 3.5%) were then formulated in a similar manner as described above. Using those pigments together with the bluish green developer obtained as described above, formation of full-color pictures of four colors was conducted. The full-color pictures so obtained were high in vividness. In addition, full-color pictures capable of projecting vivid full-color images on an OHP screen were also obtained.

EXAMPLE 7

The powdery CuPc pigment (16 parts) obtained in Example 4, the powdery AlPc pigment (14 parts) obtained in Example 1, the styrene-methacrylate ester copolymer (70 parts) used in Example 6 and water (100 parts) were charged in a heated kneader and were heated with steam under mixing, whereby the contents were thoroughly kneaded. While controlling the temperature of the resin under kneading within a range of from 90 and 95° C., water was caused to separate. Separated water was discharged, and still remaining water was caused to evaporate out while kneading the mass under heat. After the kneading was continued further, the kneaded mass was taken out of the kneader, cooled and then pulverized, whereby a high-concentration coloring composition of a bluish green color (pigment content: 30%) was obtained in the form of coarse powder. The pigment in the coarse powder was found to have an average particle size not greater than 200 nm.

In a similar manner as in Example 6, the high-concentration coloring composition and the negative charge control agent of the chromium complex type were kneaded with the styrene-methacrylate ester copolymer. The kneaded mass was cooled and then pulverized. Classification was thereafter conducted, whereby fine powder of 5 to 20 μm in particle size was obtained. Colloidal silica was added, and the resulting mixture was mixed with magnetic iron powder to provide a bluish green dry developer for electrophotography. Using this developer, pictures were formed on paper sheets by an electrophotographic copying machine for the full-color development of negative charges. The pictures presented a vivid, bright, bluish green color, and showed a variety of excellent fastness including superb light fastness. When pictures were formed on polyester sheets for OHP, the pictures had high transparency, and images of a vivid bluish green color were displayed on an OHP screen. Further, full-color pictures of four colors were formed in a similar manner as in Example 6. Those pictures were vivid full-color pictures.

EXAMPLE 8

A composite pigment (30 parts), which was composed of the CuPc pigment obtained in Example 4 and the AlPc pigment obtained in Example 1, was thoroughly kneaded together with the styrene-methacrylate ester copolymer (70 parts) used in Example 6 by a three-roll mill such that the pigment was dispersed. The kneaded mass was cooled and then coarsely ground, whereby a high-concentration coloring composition of a bluish green color (pigment content: 30%) was obtained in the form of coarse powder. The pigment in the coarse powder was found to have an average particle size not greater than 200 nm. In a similar manner as in Example 6, a bluish green dry developer for electrophotography was then formulated, and pictures were formed on paper sheets by an electrophotographic copying machine for the full-color development of negative charges. The pictures presented a vivid, bright, bluish green color.

EXAMPLE 9

The press cake (75 parts, solid content: 40%) of composite pigment obtained in Example 5 and a bisphenol-type polyester resin for negative charges (softening point: about 100° C.; 70 parts) were charged in a heated kneader, and in a similar manner as in Example 6, melt flushing was conducted. Separated water was discharged, and still remaining water was caused to evaporate out while kneading the mass under heat. After the kneading was continued further to disperse the pigment, the kneaded mass was taken out of the kneader, cooled and then coarsely ground, whereby a high-concentration coloring composition of a bluish green color (pigment content: 30%) was obtained in the form of coarse powder. In a similar manner as in Example 6, a bluish green dry developer for electrophotography was then formulated, and pictures were formed on paper sheets by an electrophotographic copying machine for the full-color development of negative charges. The pictures presented a vivid, bright, bluish green color. Further, full-color pictures of four colors were formed in a similar manner as in Example 6. Those pictures were vivid full-color pictures.

EXAMPLE 10

A composite pigment (30 parts) obtained in Example 4 and a styrene-methacrylate ester copolymer containing tertiary amino groups for positive charges (Tg: 57° C.; 70 parts) were thoroughly kneaded by a three-roll mill such that the pigment was dispersed. The kneaded mass was cooled and then coarsely ground, whereby a high-concentration coloring composition of a bluish green color (pigment content: 30%) was obtained in the form of coarse powder. The pigment in the coarse powder was found to have an average particle size not greater than 200 nm. In a similar manner as in Example 6, the high-concentration coloring composition (14.7 parts) and a styrene-methacrylate ester copolymer (85.3 parts) of the same kind as that used in the above were kneaded. The kneaded mass was cooled, ground, and then pulverized. Classification was thereafter conducted, whereby fine powder of 5 to 20 μm in particle size was obtained. Colloidal silica was added as a flow agent, and the resulting mixture was then mixed with magnetic iron powder to provide a bluish green dry developer for electrophotography. Pictures were formed with the developer on paper sheets by an electrophotographic copying machine for the full-color development of negative charges. The pictures presented a vivid, bright, bluish green color.

EXAMPLE 11

Diethyl maleate (50 parts) was placed in a vessel, to which a styrene/benzyl methacrylate/2-ethylhexyl methacrylate (weight ratio: 7/2/1) copolymer (20 parts) was added, followed by dissolution. With the resultant solution, the composite pigment (30 parts) obtained in Example 5 was mixed. The mixture so obtained was thoroughly and finely dispersed by using a continuous horizontal wet disperser with beads contained as a tumbling medium therein, whereby a dispersion of the bluish green pigment in the monomer was obtained. The particles of the pigment in the dispersion was found to have an average particle size not greater than 200 nm. Similarly, a styrene-methacrylate ester copolymer (20 parts) of the same kind as that used in Example 6 was dissolved in diethyl maleate (50 parts), to which 30 parts of the negative charge control agent of the chromium complex type were added. The resulting mixture was mixed and thoroughly and finely dispersed, whereby a dispersion of the negative charge control agent in the monomer was obtained.

The pigment dispersion (16.7 parts) and the negative charge control agent dispersion (10.0 parts), both of which had been obtained as described above, and butyl methacrylate (12.6 parts), styrene (60.7 parts), lauryl mercaptan (1.5 parts) and azoisobutyronitrile (2.0 parts) were thoroughly mixed into a homogeneous mixture. To the mixture (103.5 parts), a 4% dispersion (200 parts) of colloidal silica in water was gradually added while stirring the mixture by a high-shear and high-speed agitator, whereby an oil-in-water type emulsion was prepared.

A 4% dispersion (200 parts) of colloidal silica in water and about one third of the emulsion obtained as described above were charged into a polymerization reactor, followed by a polymerization reaction at 75 to 80° C. for 2 hours. Subsequently, the remaining about two thirds portion was added dropwise through a dropping funnel over 3 hours, followed by stirring for further 1 hour. The mixture was then heated to 85° C., at which stirring was conducted for 1 hour to complete the polymerization reaction. A polymerized product so formed was collected by filtration, washed with an aqueous solution of sodium hydroxide to remove silica, thoroughly washed with water, and then dried, whereby a bluish green polymer was obtained in the form of fine powder the average particle size of which was about 8 μm. Subsequently, the fine powder was mixed with colloidal silica and magnetic iron powder to provide a dry developer for electrophotography. Pictures formed on paper sheets by electrophotographic copying machine for the full-color development of negative charges presented a vivid, bright, bluish green color.

EXAMPLE 12

The press cake (75 parts, solid content: 40%) of the composite pigment obtained in Example 5 and a styrene-methacrylate ester copolymer containing tertiary amino groups (Tg: 57° C.; 70 parts) were charged in a heated kneader, and in a similar manner as in Example 6, coarse powder of a high-concentration coloring composition was obtained. The bluish green coarse powder (10 parts) was then added together with a methacrylate ester resin (Tg: 48° C.; 15 parts), which is soluble in an aliphatic hydrocarbon solvent, to "Isoper G" (trade name, product of Exxon Company; 75 parts). The resulting mixture was shaken together with glass beads for 20 hours on a paint conditioner, whereby the bluish green coarse powder was dispersed and a thick coloring liquid formulation was prepared. Pigment particles in the thick coloring liquid formulation were found to have an average particle size not greater than 200 nm. The thick coloring liquid formulation (200 parts) was added to and dispersed in "Isoper G" (800 parts), whereby a wet developer for electrophotography was obtained. Using the wet developer, pictures were formed by a full-color wet electrophotographic copying machine. The pictures so obtained presented a vivid bluish green color. Those pictures showed a variety of excellent fastness including superb light fastness.

EXAMPLE 13

To a conventionally-known powdery CuPc pigment (5 parts) and the powdery AlPc pigment (5 parts) obtained in Example 1, an ester wax (41 parts), a paraffin wax (41 parts), a styrene-methacrylate ester copolymer (Tg: 57° C.; 70 parts) and silica (3 parts) were added as binders and as a dispersion medium, water (50 parts) were also added. The resulting mixture was kneaded at a temperature close to the melting point or softening point of the resin under atmospheric pressure, whereby separated water was removed and remaining water was caused to evaporate. In a manner known per se in the art, the thus obtained coloring composition was coated on a polyethylene film to provide a thermal transfer ink ribbon of a bluish green color.

Using the thermal transfer ink ribbon, pictures were formed by a full-color thermal transfer printer. The pictures so obtained presented a vivid bluish green color. Those pictures showed a variety of excellent fastness including superb light fastness. When pictures were formed on polyester sheets for OHP, the pictures so obtained were full-color pictures capable of projecting transparent full-color images on a screen.

EXAMPLE 14

A water-base pigment dispersion prepared from the water-wet press cake (12.5 parts, pigment content: 40%) of composite pigment obtained in Example 5, a styrene-butyl acrylate-ethyl methacrylate copolymer (3 parts), ethylene glycol (22 parts), glycerin (8 parts) and water (50 parts). Coarse pigment particles were removed by an ultracentrifugal separator, whereby an ink-jet ink was obtained. Using the ink-jet ink, image information was printed by an on-demand ink-jet printer equipped with a piezoelectric oscillator. Pictures of a vivid bluish green color were obtained. Using the same magenta pigment, yellow pigment and black pigment as those employed in Example 6, ink-jet inks of magenta, yellow and black colors were formulated, respectively. Using those ink-jet inks together with the bluish green ink obtained as described above, full-color printing of four colors was conducted. Vivid full-color pictures were obtained.

What is claimed is:

1. A composite pigment of a bluish green color, comprising copper phthalocyanine and aluminum phthalocyanine.

2. A composite pigment according to claim 1, wherein said copper phthalocyanine and said aluminum phthalocyanine are in the form of a mixture or a solid solution.

3. A composite pigment according to claim 1, wherein said copper phthalocyanine and said aluminum phthalocyanine account for 95 to 5 wt. % and 5 to 95 wt. %, respectively, of said composite pigment.

4. A composite pigment according to claim 3, wherein said copper phthalocyanine and said aluminum phthalocyanine account for 70 to 30 wt. % and 30 to 70 wt. %, respectively, of said composite pigment.

5. A process for the production of a composite pigment, which comprises mixing copper phthalocyanine and aluminum phthalocyanine into a mixture and then converting said mixture into a pigment form.

6. A process for the production of a composite pigment, which comprises concurrently synthesizing copper phthalocyanine and aluminum phthalocyanine in the presence of a copper salt and an aluminum salt and then converting the resultant synthesis products into a pigment form.

7. A process for the production of a composite pigment, which comprises synthesizing either copper phthalocyanine in the presence of aluminum phthalocyanine, or aluminum phthalocyanine in the presence of copper phthalocyanine, and then converting both of said copper and aluminum phthalocyanines into a pigment form.

8. A process for the production of a composite pigment, which comprises mixing copper phthalocyanine, which has been converted into a pigment form, or a press cake thereof with aluminum phthalocyanine, which has been converted into a pigment form, or a press cake thereof.

9. A coloring composition comprising at least a pigment and a resin, said pigment comprising copper phthalocyanine and aluminum phthalocyanine.

10. A coloring composition according to claim 9, wherein said pigment is a mixed pigment or solid solution pigment comprising copper phthalocyanine and aluminum phthalocyanine.

11. A coloring composition according to claim 10, wherein said mixed pigment or solid solution pigment is in the form of particles having a weight average particle size not greater than 200 nm.

12. A coloring composition according to claim 9, wherein said copper phthalocyanine and said aluminum phthalocyanine account for 95 to 5 wt. % and 5 to 95 wt. %, respectively, of said pigment.

13. A coloring composition according to claim 9, wherein said pigment is in the form of a solid, paste or liquid with said pigment being dispersed in a resin or a resin solution.

14. A coloring composition according to claim 13, wherein said pigment is present in an amount of from 10 to 70 wt. % of said coloring composition.

15. A coloring composition according to claims 14, wherein the amount of said pigment is from 20 to 60 wt. % of said coloring composition.

16. A process for the production of a coloring composition, which comprises mixing copper phthalocyanine and aluminum phthalocyanine, which have been independently comminuted, into a composite pigment, and then kneading said pigment and a resin such that said pigment is dispersed in said resin.

17. A process for the production of a coloring composition, which comprises mixing a water-wet press cake of copper phthalocyanine and a water-wet press cake of aluminum phthalocyanine into a mixture, drying said mixture into a dried mixture, comminuting said dried mixture into a composite pigment, and then kneading said pigment and a resin such that said pigment is dispersed in said resin.

18. A process for the production of a coloring composition, which comprises comminuting a mixture of copper phthalocyanine and aluminum phthalocyanine into a composite pigment, and then kneading said pigment and a resin such that said pigment is dispersed in said resin.

19. A process for the production of a coloring composition, which comprises kneading a pigment source—which is selected from the group consisting of (a) a water-wet press cake of copper phthalocyanine and a water-wet press cake of aluminum phthalocyanine, (b) a mixture of both of said press cakes and (c) a water-wet press cake of a composite pigment comprising copper phthalocyanine and aluminum phthalocyanine—with a resin at a temperature not higher than 120° C. such that said pigment source is dispersed in said resin.

20. A process for the production of a coloring composition, which comprises kneading a comminuted powder of copper phthalocyanine, a comminuted powder of aluminum phthalocyanine, a resin and water at a temperature not higher than 120° C. such that said comminuted powders of said phthalocyanines are both dispersed in said resin.

21. A process for the production of a coloring composition, which comprises evenly dispersing a composite pigment, which comprises copper phthalocyanine and aluminum phthalocyanine, in a polymerization reaction mixture of at least one polymerizable monomer which when polymerized can form a resin, and then polymerizing said monomer such that said composite pigment is dispersed in said resin.

22. An image recording substance produced from a coloring composition comprising at least a pigment and a resin, said pigment being a mixed pigment or solid solution pigment comprising copper phthalocyanine and aluminum phthalocyanine.

23. An image recording substance according to claim 22, which is a dry developer of a fine powder form or a wet developer of a liquid form.

24. An image recording substance according to claim 22, which is an ink-jet ink.

25. An image recording substance according to claim 22, which is a thermal transfer ink ribbon with said coloring composition coated on a film-shaped or sheet-shaped base material.

26. An image recording substance according to claim 22, wherein said copper phthalocyanine and said aluminum phthalocyanine account for 95 to 5 wt. % and 5 to 95 wt. %, respectively, of said pigment.

27. An image recording substance according to claim 22, wherein said pigment is present in an amount of from 1 to 20 wt. % of said image recording substance.

\* \* \* \* \*